(12) United States Patent
Goto

(10) Patent No.: US 10,377,613 B2
(45) Date of Patent: Aug. 13, 2019

(54) FORKLIFT TRUCK AND METHOD OF OPERATING THE SAME

(71) Applicant: KABUSHIKI KAISHA TOYOTA JIDOSHOKKI, Kariya-shi, Aichi-ken (JP)

(72) Inventor: Shinya Goto, Aichi-ken (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 0 days.

(21) Appl. No.: 15/782,972

(22) Filed: Oct. 13, 2017

(65) Prior Publication Data
US 2018/0105406 A1 Apr. 19, 2018

(30) Foreign Application Priority Data
Oct. 14, 2016 (JP) .................................. 2016-202846

(51) Int. Cl.
*B66F 9/075* (2006.01)
*G01B 11/02* (2006.01)

(52) U.S. Cl.
CPC .......... *B66F 9/0755* (2013.01); *G01B 11/026* (2013.01)

(58) Field of Classification Search
CPC ........ B66F 9/0755; B66F 9/24; G01B 11/026
See application file for complete search history.

(56) References Cited

U.S. PATENT DOCUMENTS

| 6,411,210 B1 * | 6/2002 | Sower | B66F 9/0755 |
| | | | 250/491.1 |
| 8,538,577 B2 * | 9/2013 | Bell | B66F 9/0755 |
| | | | 414/273 |
| 8,561,897 B2 * | 10/2013 | Kunzig | G06Q 10/087 |
| | | | 235/385 |

(Continued)

FOREIGN PATENT DOCUMENTS

| JP | 2006-528122 A | 12/2006 |
| JP | 2013-230903 A | 11/2013 |
| JP | 2015-171933 A | 10/2015 |

OTHER PUBLICATIONS

Screen homepage of INTECHNO.
Communication dated May 30, 2018, from the Intellectual Property Office of Singapore in counterpart application No. 10201708398Q.

*Primary Examiner* — Kaitlin S Joerger
(74) *Attorney, Agent, or Firm* — Sughrue Mion, PLLC

(57) ABSTRACT

A forklift truck includes a two-dimensional rangefinder, a mover device, a calculator, and a determiner. The two-dimensional rangefinder emits a measurement wave in a downwardly inclined direction from above and toward a first load and measures a distance to a measurement point located on a surface of the first load. The mover device moves the two-dimensional rangefinder. The calculator calculates a longitudinal distance between the emitting source and the measurement point. The determiner determines that the first load is in a condition in which there is a level difference between a front part and a rear part of an upper surface of the first load, and the front part is higher than the rear part, when a variation in the longitudinal distance that is generated in response to a displacement of the two-dimensional rangefinder moved by the mover device exceeds an upper limit of a specified threshold range.

7 Claims, 4 Drawing Sheets

(56) References Cited

U.S. PATENT DOCUMENTS

| | | | |
|---|---|---|---|
| 8,565,913 B2* | 10/2013 | Emanuel | B66F 9/0755 |
| | | | 340/572.1 |
| 9,170,090 B2* | 10/2015 | Hansen | B66F 9/0755 |
| 9,623,794 B2* | 4/2017 | Quinlan | B60Q 1/0023 |
| 9,932,213 B2* | 4/2018 | Buchmann | B66F 9/0755 |
| 2008/0011554 A1* | 1/2008 | Broesel | B66F 9/0755 |
| | | | 187/224 |
| 2011/0218670 A1 | 9/2011 | Bell et al. | |
| 2016/0090283 A1* | 3/2016 | Svensson | B66F 9/14 |
| | | | 701/50 |
| 2017/0015537 A1* | 1/2017 | Bosworth, III | B66F 9/0755 |
| 2017/0311406 A1* | 10/2017 | Quinlan | B60Q 1/0023 |
| 2018/0019788 A1* | 1/2018 | Wadell | B60L 1/00 |
| 2018/0105406 A1* | 4/2018 | Goto | G01B 11/026 |

* cited by examiner

| LIFTED HEIGHT | EMITTING ANGLE | X | Y |
|---|---|---|---|
| H0 | θ1 | X11 | Y11 |
| | θ2 | X12 | Y12 |
| | θ3 | X13 | Y13 |
| | θ4 | X14 | Y14 |
| | θ5 | X15 | Y15 |
| | ... | ... | ... |
| H1 | θ1 | X21 | Y21 |
| | θ2 | X22 | Y22 |
| | θ3 | X23 | Y23 |
| | θ4 | X24 | Y24 |
| | θ5 | X25 | Y25 |
| | ... | ... | ... |
| H2 | θ1 | X31 | Y31 |
| | θ2 | X32 | Y32 |
| | θ3 | X33 | Y33 |
| | θ4 | X34 | Y34 |
| | θ5 | X35 | Y35 |
| | ... | ... | ... |
| ... | ... | ... | ... |

FORKLIFT TRUCK AND METHOD OF OPERATING THE SAME

BACKGROUND OF THE INVENTION

The present invention relates to a forklift truck and to a method of operating a forklift truck.

For example, Japanese Unexamined Patent Application Publication No. 2006-528122 (published Japanese translation of PCT international publication No. WO/2004/103882) discloses a forklift truck for transporting loads. The forklift truck of the Publication has a two-dimensional rangefinder with which to check for the presence of any load on the forks or any obstacle around the forklift truck. The two-dimensional rangefinder emits measurement wave and measures the distance from the emitting source of the measurement wave to a point in an object at which the measurement wave is incident and reflected.

Operation of a forklift truck includes placing or tiering of loads. In the case of placing loads in tiers, the forklift truck places a pallet carrying a second load on the upper surface of a first load, which is placed before the second load. At this time, if the upper surface of the first load is not flat and has a level difference, the second load cannot be placed on the surface. Even if the first load allows the second load to be placed thereon, the second load or the second tier is unstable. Assume that the side of the first load to which the forklift truck approaches is the front of the first load and the side of the first load opposite to the front thereof and away from the forklift is the rear of the first load. If there is a difference in level in the upper surface of the first load and the front part of the upper surface is higher than the rear part, the second load placed on such upper surface tends to tilt rearward. It may be contemplated to detect the level difference in the upper surface of the first load by measuring the distances with the two-dimensional rangefinder. However, if the front part of the upper surface of the first load is higher than the rear part, the measurement wave from the rangefinder is blocked by the front part and does not reach the rear part.

SUMMARY OF THE INVENTION

The present invention, which has been made in view of the circumstances above, is directed to providing a forklift truck which is capable of determining in placing on a first load a second load whether or not there is any level difference between the front part and the rear part of the upper surface of the first load and determining whether or not the front part is higher than the rear part.

In accordance with an aspect of the present invention, there is provided a forklift truck that is configured for placing on a first load a second load. The forklift truck includes a pair of forks for holding the second load, an actuator for raising and lowering the forks, and a two-dimensional rangefinder having an emitting source configured to emit a measurement wave in a downwardly inclined direction and from above toward the first load. The two-dimensional rangefinder is configured to measure a distance between the emitting source and a measurement point which is located on a surface of the first load and at which the measurement wave is incident. The forklift truck further includes a mover device, a calculator, and a determiner. The mover device is configured to move the two-dimensional rangefinder so that the measurement point P moves in a longitudinal direction in which the first load and the forklift truck carrying the second load face each other. The calculator is configured to calculate a longitudinal distance between the emitting source and the measurement point based on the distance measured by the two-dimensional rangefinder. The determiner is configured to determine that the first load is in a condition in which there is a level difference between a front part and a rear part of an upper surface of the first load, and the front part is higher than the rear part, when a variation in the longitudinal distance that is generated in response to a displacement of the two-dimensional rangefinder moved by the mover device exceeds an upper limit of a specified threshold range.

DETAILED DESCRIPTION OF THE EMBODIMENTS

The following will describe a forklift truck according to a first embodiment of the present invention.

Figure 1:
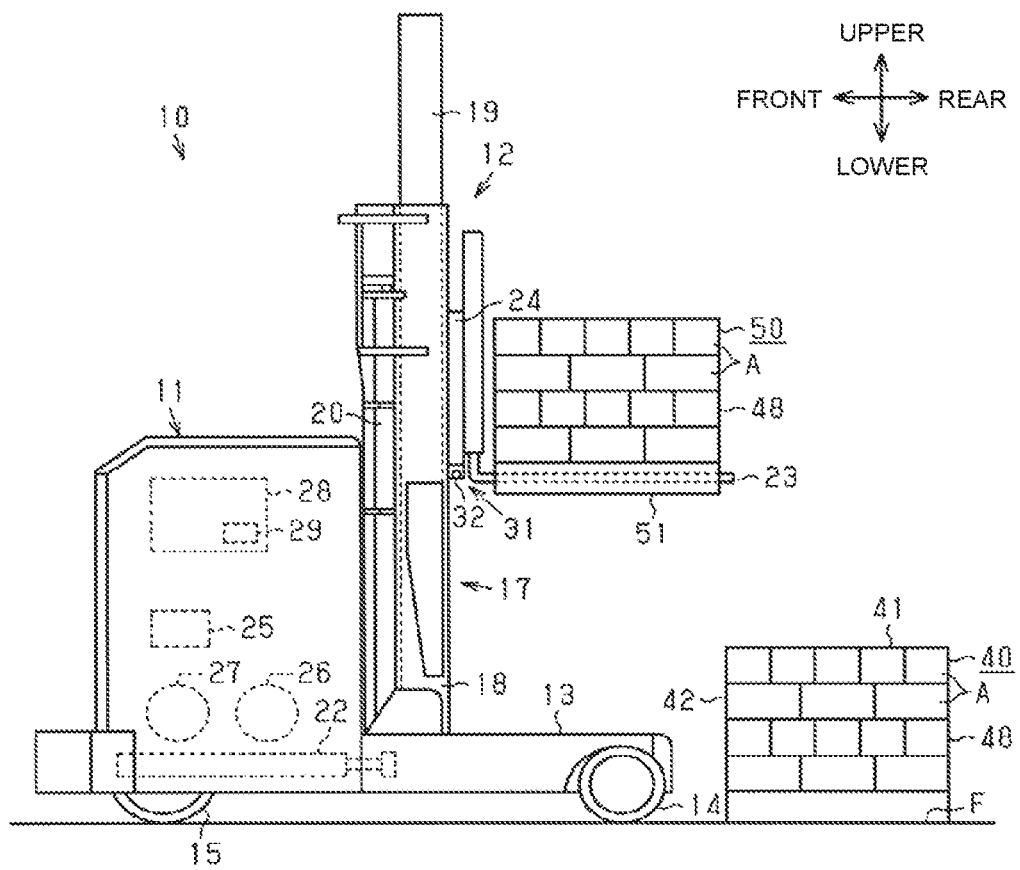
FIG. 1 is a schematic side view of a forklift truck according to an embodiment of the present invention.

Referring to FIG. 1, there is shown a forklift truck denoted by numeral 10 that includes a vehicle body 11 and a load-handling device 12 mounted to the vehicle body 11. The forklift truck 10 further includes a pair of reach legs 13 (only one reach leg 13 is shown) extending in a direction away from the vehicle body 11. Each reach leg has a front wheel 14. A rear wheel 15 is mounted to the vehicle body 11. In the forklift truck 10 according to the present embodiment, the rear wheel 15 functions as the steerable and driving wheel.

The load-handling device 12 includes a two-stage mast assembly 17 including a pair of outer masts 18 (only one outer mast 18 is shown) and a pair of inner masts 19 (only one inner mast 19 is shown). The load-handling device 12 further includes a pair of lift cylinders 20 (only one lift cylinder 20 is shown) that is coupled to the respective inner masts 19 and functions as the actuator of the present invention. The load-handling device 12 also includes a pair of reach cylinders 22 (only one reach cylinder 22 is shown) coupled to the mast assembly 17. The lift cylinders 20 and the reach cylinders 22 are hydraulic cylinders. The inner masts 19 are movable up and down by the hydraulic oil flowing to and out from the lift cylinders 20. The mast assembly 17 is movable back and forth along the reach legs 13. Specifically, the mast assembly 17 is movable along the reach legs 13 toward and away from the vehicle body 11 by the hydraulic oil flowing to and out from the lift cylinders 20.

The forklift truck 10 includes a pair of forks 23 (only one fork 23 is shown) and a lift bracket 24 for fixing the forks 23 to the mast assembly 17. The forks 23 and the lift bracket 24 are movable up and down with the vertical movement of the inner masts 19.

The forklift truck 10 includes a hydraulic pump 25 that supplies the lift cylinders 20 and the reach cylinders 22 with hydraulic oil, a load-handling motor 26 that drives the hydraulic pump 25, and a drive motor 27 that drives the rear wheel 15. The forklift truck 10 includes a controller 28 mounted to the vehicle body 11. The controller 28 includes a storage 29 that stores therein various programs for controlling the forklift truck 10. The forklift truck 10 according to the present embodiment is an unmanned, automated guided vehicle that travels and performs loading operation according to the instructions from an upper-level controller (not shown) and based on the programs stored in the storage 29.

A two-dimensional rangefinder 31 (hereinafter, the 2D rangefinder 31) is mounted to the bottom of the lift bracket 24 of the forklift truck 10. The 2D rangefinder 31 is provided at a position higher than the level of the lower surfaces of the forks 23 so that no part of the 2D rangefinder 31 is positioned below the lower surfaces of the forks 23. The 2D rangefinder 31 according to the present embodiment is a laser rangefinder having an emitting source (a light source) 32. The emitting source 32 emits a laser light while changing the emitting angle in the horizontal direction (or the horizontal plane). The 2D rangefinder 31 measures the distance to an object based on the reflected wave of the laser light emitted from the emitting source 32. Specifically, the 2D rangefinder 31 detects the distance between the emitting source 32 and a measurement point which is located on the object and at which the emitted laser light is incident and reflected. The 2D rangefinder 31 outputs to the controller 28 a signal indicative of the measured distances and the emitting angles at the time of the measurement. It is to be noted that the laser light corresponds to the measurement wave of the present invention.

The 2D rangefinder 31 is fixed to the lift bracket 24 so that the laser light is emitted inclined downwardly (in the vertical direction) from the emitting source 32. In other words, the 2D rangefinder 31 of the present embodiment emits a laser light in a downwardly inclined direction while changing the emitting angle in the horizontal direction.

Referring to FIG. 1, numeral 40 denotes a first stack of loads placed on the floor of a loading/unloading area F and numeral 50 denotes a second stack of loads placed on a pallet 51 which is supported by the forks 23 of the forklift truck 10. The forklift truck 10 is operable to place or tier the second stack of loads 50 on the upper surface of the first stack of loads 40. Hereinafter, the first stack of loads 40 and the second stack of loads 50 are referred to as the first stack 40 and the second stack 50, respectively. The first load 40 and the second load 50 correspond to the first load and the second load, respectively, of the present invention.

The first and second stacks 40, 50 of the present embodiment are each a package of multiple loads A that are unitized or palletized in a rectangular shape. The upper surface 41 of the first stack 40 is generally flat so as to permit the second stack 50 to be placed thereon successfully. It is to be noted that the surfaces of the first and second stacks 40, 50 may include minor level differences or irregularities due to the fact that the stacks 40, 50 are formed by gathering multiple loads A. According to the present embodiment, the upper surface 41 of the first stack 40 is flat to such an extent that permits the second stack 50 to be placed successfully on the first stack 40.

The following will describe procedures for placing the second stack 50 on the first stack 40 in tiers. In placing the second stack 50 on the first stack 40, the forks 23 of the forklift truck 10 are inserted into the fork receiving holes of the pallet 51 carrying the second stack 50. For that purpose, the controller 28 controls the rear wheel 15 to move the forklift truck 10 to a position adjacent to the first stack 40. Specifically, the forklift truck 10 is moved and positioned in front of one of the four lateral sides of the first stack 40.

The controller 28 hydraulically controls the lift cylinders 20 to raise the forks 23 to a position higher than the level of the upper surface 41 of the first stack 40. The controller 28 hydraulically controls the reach cylinders 22 to move the forks 23 to be located immediately above the first stack 40. The controller 28 hydraulically controls the lift cylinders 20 to lower the forks 23 until the pallet 51 contacts with the upper surface 41 of the first stack 40. The controller 28 hydraulically controls the reach cylinders 22 to remove the forks 23 from the pallet 51 to end the tiering operation.

In raising the forks 23 higher than the level of the upper surface 41 of the first stack 40, the controller 28 of the present embodiment determines whether the second stack 50 is placeable on the first stack 40 or not. The following will describe the details of the determination made by the controller 28. It is to be noted that, in the horizontal direction, the direction in which the first stack 40 and the forklift truck 10 face each other during the tiering operation of the second stack 50, is referred to as the longitudinal direction. In the present embodiment, the lateral side of the first stack 40 to and from which the forklift truck 10 approaches and separates is denoted as front of the first stack 40, and the lateral side of the first stack 40 which is opposite to the front and away from the forklift truck 10 is denoted as rear of the first stack 40. Further, in the horizontal direction, the direction that intersects the above longitudinal direction at a right angle will be referred to as the lateral direction. Accordingly, the remaining two opposite lateral sides of the first stack 40 are referred to as right and left of the first stack 40. Alternatively, the direction in which the forklift truck 10 approaches the first stack 40 may be referred to as the forward direction, and the direction in which the forklift truck 10 is separated from the first stack 40 may be referred to as the rearward direction. In this case, the front and the rear of the first stack 40 in the longitudinal direction that are defined earlier are reversed.

As shown in FIGS. 2A to 2D, while the forks 23 are being raised, the controller 28 measures distances between the emitting source 32 of the 2D rangefinder 31 and the first stack 40. The measurement is carried out at each of the specified lifted heights (heights) of the forks 23 (the 2D rangefinder 31). The height of the 2D rangefinder 31 which is mounted to the lift bracket 24 increases with an increase of the lifted height of the forks 23, and the measurement point P moves accordingly with the increase of the height of the 2D rangefinder 31 and the forks 23. The lift cylinders 20 in the present embodiment correspond to the mover device of the present invention that moves the 2D rangefinder 31 by its motion.

Figure 2A:
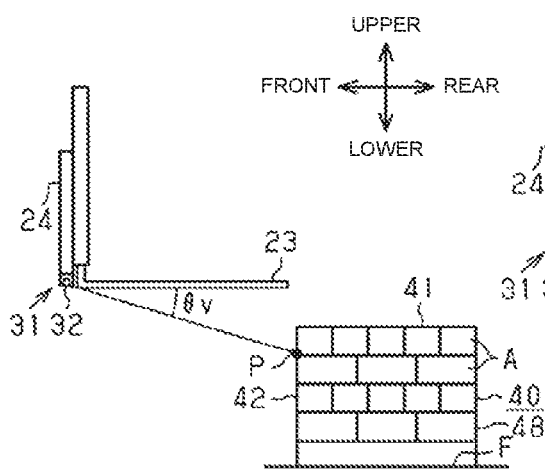
FIG. 2A is a schematic side view showing a relationship between a lifted height of the forks of the forklift truck of FIG. 1 and a measurement point in a first stack of loads.

FIG. 2A shows a relationship between the lifted height of the forks 23 of the forklift truck 10 and the measurement point P on the first stack 40. In the case of FIG. 2A, the forks 23 are positioned at the lowest lifted height of the above-mentioned different specified lifted heights and the measurement point P at which the laser light is incident and reflected is located on a front surface 42 of the first stack 40. The controller 28 of the present embodiment stores in the storage 29 thereof height data including the height dimension of the first stack 40 which is placed in the loading/unloading area F. The height data also includes the number of loads A placed in the loading/unloading area F. The controller 28 updates the data of the total number of stacked loads A each time a new load A is added in the loading/unloading area F. The height dimension of the load A is stored in the storage 29 beforehand. Therefore, the overall height of the first stack 40 formed of the stacked loads A may be determined based on the height dimension of the load A and the number of stacked loads A. It is to be noted that the first stack 40 herein refers to a single load A or a plurality of loads A, as the case may be, which is/are placed in the loading/unloading area F before the second stack 50 is placed on the first stack 40. Therefore, as in the case of the present embodiment, when multiple loads A are placed in the loading/unloading area F, then the first stack 40 refers to the whole of the loads A. The same also applies to the second stack 50.

Subsequently, the controller 28 uses the height data in the storage 29 to select and determine the lowest lifted height of the forks 23 so that the measurement point P on the front surface 42 of the first stack 40 is located slightly lower than the level of the upper surface 41 of the first stack 40. The other lifted heights that are higher than the lowest lifted height are set at specified increments. In the present embodiment, the increments of the lifted heights of the forks 23 are constant.

Figure 2B:
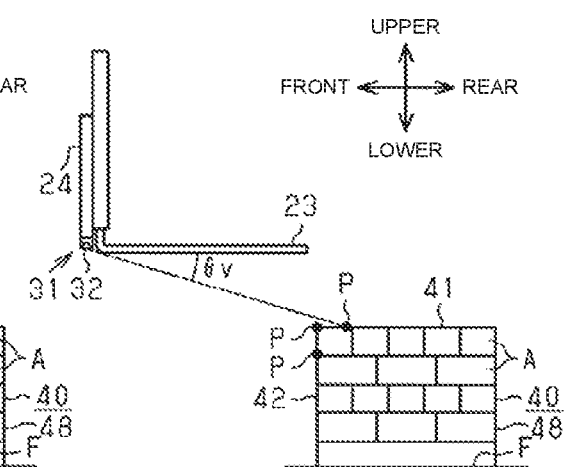
FIG. 2B is another schematic side view showing a relationship between the lifted height of the forks and the measurement point.
Figure 2C:
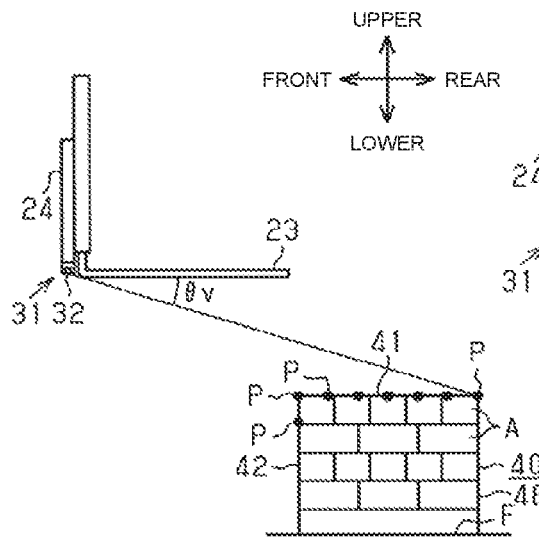
FIG. 2C is a still another schematic side view showing a relationship between the lifted height of the forks and the measurement point.

FIGS. 2B and 2C show the forks 23 (and the lift bracket 24) raised further from the lowest lifted height. In the course of raising the forks 23, the measurement point P is moved from the front surface 42 to the upper surface 41 of the first stack 40. The measurement point P is then moved rearward on the upper surface 41 with the increase of the height of the forks 23.

Figure 2D:
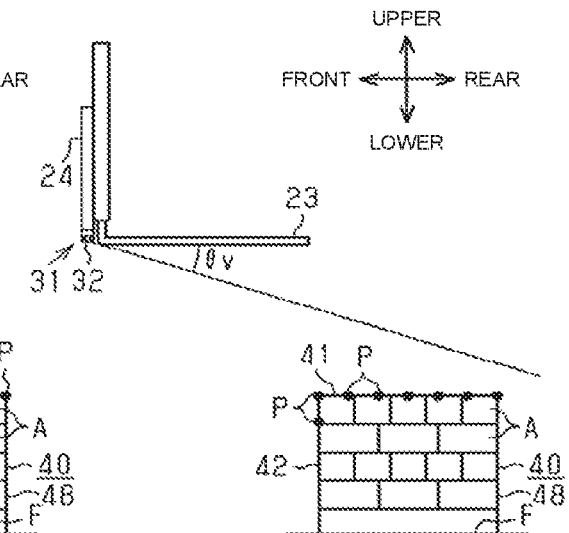
FIG. 2D is yet another schematic side view showing a relationship between the lifted height of the forks and the measurement point.

When the measurement point P has moved beyond the rear end of the upper surface 41, as shown in FIG. 2D, the controller 28 stops the operation of raising the forks 23. The determination as to whether or not the measurement point P has moved beyond the rear end of the upper surface 41 is made based on the distance measured by the 2D rangefinder 31. Specifically, when the measurement point P is moved further than the rear end of the upper surface 41, the measured distance becomes longer than the distances measured with respect to the measurement point P moving on the upper surface 41, or otherwise, the distance becomes unmeasurable. Therefore, a threshold is set in relation to the measured distances so as to determine whether or not the measurement point P has moved beyond the rear end of the upper surface 41 of the first stack 40.

As described above, the 2D rangefinder 31 emits a laser light from the emitting source 32 obliquely downward from above toward the first stack 40. The distance measured by the 2D rangefinder 31 includes a horizontal component and a vertical component. If the inclination of the laser light in the vertical direction is expressed by $\theta v$, as shown in FIGS. 2A to 2D, the distance in the horizontal direction between the emitting source 32 and the measurement point P (hereinafter, the horizontal distance) can be obtained using Equation (1) below:

Horizontal distance=distance×cos $\theta v$    Equation (1)

It is to be noted that in the horizontal distance obtained by Equation (1), the inclination of the laser light in the vertical direction is ignored. That is, the horizontal distance herein substantially corresponds to the distance between the emitting source 32 and the measurement point P measured assuming that the laser light is emitted in the horizontal direction. The controller 28 calculates the horizontal distance with Equation (1).

Figures 3, 4:
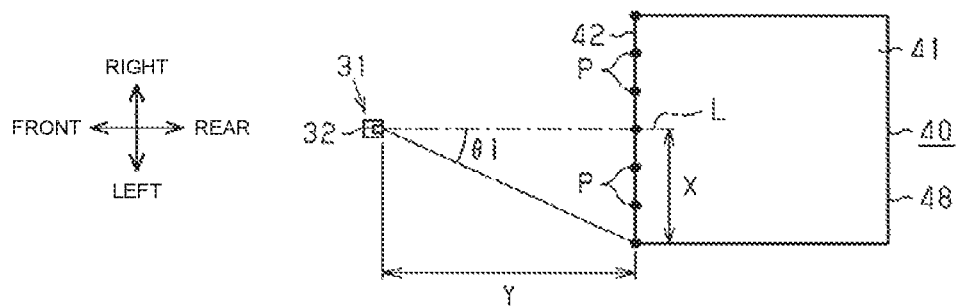
FIG. 3 is a plan view showing a first load.
FIG. 4 is a table showing data stored in a storage.

Referring to FIG. 3, the emitting angle or the incident angle at which the incidence of laser light is normal to the first stack 40 in a plan view is regarded as the reference angle, or, zero degrees, and the 2D rangefinder 31 emits laser light while changing the emitting angle. Therefore, the horizontal distance obtained by Equation (1) includes the longitudinal component and a lateral component which depends on the incident angle of the laser light other than the reference zero degrees. The 2D rangefinder 31 calculates the distance in the longitudinal direction (hereinafter, the longitudinal distance) and the distance in the lateral direction (hereinafter, the lateral distance) using the horizontal distance obtained with Equation (1). If the emitting angle is expressed by $\theta i$, the lateral distance X can be obtained using Equation (2) and the longitudinal distance Y can be obtained using Equation (3).

Lateral distance $X$=Horizontal distance×sin $\theta i$    Equation (2)

Longitudinal distance $Y$=Horizontal distance×cos $\theta i$    Equation (3)

The longitudinal distance Y obtained with Equation (2) is based on the horizontal distance, and the lateral component is ignored. That is, the longitudinal distance Y corresponds to the distance between the emitting source 32 and the measurement point P at which the incidence of the laser light is normal to the first stack 40 in a plan view or at the emitting angle of zero degrees. It is also to be noted that in the lateral distance X obtained with Equation (3) is based on the horizontal distance, and the longitudinal component is ignored. That is, the lateral distance X corresponds to the distance between the intersection between an imaginary center line L bisecting the upper surface 41 and the measurement point P. The controller 28 calculates the lateral distance X and the longitudinal distance Y with Equations (2) and (3), respectively. The controller 28 in the present embodiment corresponds to the calculator of the present invention.

The following will describe the operation of the forklift truck 10 and the control performed by the controller 28 according to the present embodiment.

Referring to FIG. 4 showing a table of data that stored in the storage 29 of the controller 28, the longitudinal distances Y and the lateral distances X are shown in correlation with the lifted heights (H0, H1, H2, . . . ) and the emitting angles ($\theta 1, \theta 2, \theta 3, \theta 4, \theta 5$ . . . ). Then, the controller 28 makes determinations as to whether or not the second stack 50 is placeable on the first stack 40 based on the longitudinal distance Y. The procedures for the determination will be described in detail below.

The controller 28 acquires data of the distances between the emitting source 32 and the measurement point P at each specified lifted height while changing the emitting angle of the laser light. Each time the lifted height is shifted by an increment, the controller 28 calculates or measures the difference between the longitudinal distance Y measured at the current lifted height of the forks 23 and the longitudinal distance Y measured at the last lifted height immediately before the current lifted height for each of the specified emitted angles. The measurements of the longitudinal distance Y at the lowest lifted height are not used for the calculation. If the distances are measured in increments of 5 degrees of the emitting angle, for example, then the difference is calculated between the two consecutive longitudinal distances Y measured at the emitting angle of 0 degrees, between the two consecutive longitudinal distances Y measured at the emitting angle of 5 degrees, between the two consecutive longitudinal distances Y measured at 10 degrees, and so forth. A series of such calculations is performed for each of the specified lifted heights. To be specific, each time the lifted height is shifted, the controller 28 calculates the variation in the longitudinal distance Y from the last lifted height for each of the emitting angles. It is to be noted that in the following description, the difference between the longitudinal distance Y measured at a certain lifted height and at a certain emitting angle and the longitudinal distance Y measured at the last lifted height and at the same emitting angle as the former lifted height will collectively be referred to as "the difference in the longitudinal distance Y". The difference in the longitudinal distance Y corresponds to the variation in the longitudinal distance of the present invention that is generated in response to a displacement of the 2D rangefinder 31.

As shown in FIG. 2A, when the measurement point P is located on the front surface 42, the longitudinal distance Y measured at the same emitting angle is a fixed value and does not vary irrespective of the shifting of the lifted height. When the measurement point P is moved from the front surface 42 and located on the upper surface 41 of the first stack 40, the measurement point P moves rearward on the upper surface 41 with the increase of the lifted height of the forks 23. In the case where the upper surface 41 is generally flat, the displacement (or the lifted amount) of the 2D rangefinder 31 is proportional to the displacement of the measurement point P on the upper surface 41. Based on the proportional relationship, the displacement of the measurement point P may be estimated beforehand for each shift of the lifted height. The displacement of the measurement point P herein refers to the distance of movement of the measurement point P from the previous measurement point. The displacement of the measurement point P is equivalent to the difference in the longitudinal distance Y while the measurement point P is located on the upper surface 41.

In the present embodiment, the aforementioned threshold corresponds to the value which is obtained by adding and subtracting a margin to and from the displacement of the measurement point P in response to an increment of the lifted height of the forks 23 or the 2D rangefinder 31. Specifically, the threshold has a range between "the displacement of the measurement point P less the margin" as the lower limit and "the displacement of the measurement point P plus the margin" as the upper limit. It is to be noted that the margin is provided for allowing minor level differences in the upper surface 41 which still permit the second stack 50 to be placed on the first stack 40 and for accommodating minor measurement errors.

As described above, when the upper surface 41 of the first stack 40 is generally flat, the displacement or the lifted amount of the 2D rangefinder 31 is proportional to the displacement of the measurement point P located on the upper surface 41. Therefore, the difference in the longitudinal distance Y (or the displacement of the measurement point P) calculated at each increment of the lifted height always falls within the threshold range. The controller 28 makes a determination for each of the specified lifted heights as to whether or not the difference in the longitudinal distance Y falls within the threshold range. If no difference in the longitudinal distance Y falling outside the threshold range is found until the measurement point P is moved beyond the rear end of the upper surface 41, then it is determined that the upper surface 41 is generally flat. If it is determined that the upper surface 41 is generally flat, the controller 28 controls the forklift truck 10 to place the pallet 51 carrying the second stack 50 on the upper surface 41 of the first stack 40.

Figure 5:
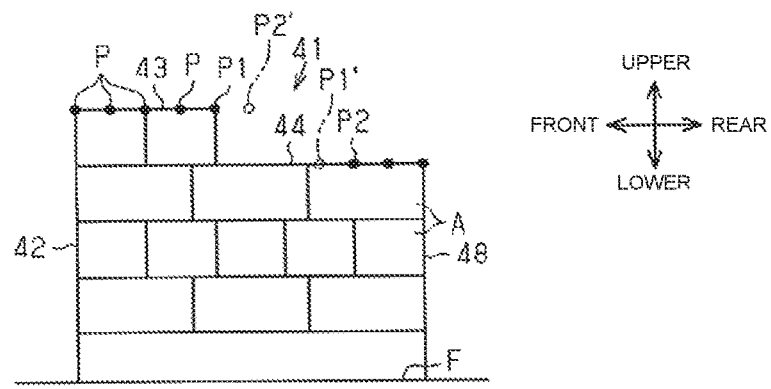
FIG. 5 is a schematic side view of the first load in a shortage condition.

The following will now describe a different condition of the first stack 40 in which the number of tiers of the loads A is greater in the front part thereof than in the rear part and, therefore, there is a level difference in the upper surface 41 and the front part of the upper surface 41 is higher than the rear part thereof, as shown in FIG. 5. For the ease of explanation, this condition of the first stack 40 will be referred to as the shortage condition, since the first stack 40 is short of the loads A in the rear part thereof relative to the front part. The upper surface 41 of the first stack 40 in the shortage condition has a first upper surface 43 in the part (the front part) of the stack 40 having a greater number of tiers of the loads A and a second upper surface 44 in the part (the rear part) of the first stack 40 which is short of the loads A or has a fewer number of tiers of the loads A than the former part. The first upper surface 43 is located higher than the second upper surface 44.

As is the case of the first stack 40 having a generally flat upper surface 41, when the first stack 40 is in the shortage condition, as long as the measurement point P is located on the front surface 42, the longitudinal distance Y measured at the same emitting angle is a fixed value and does not vary irrespective of the shifting of the lifted height.

In the first stack 40 with the shortage condition, there exists a certain lifted height of the forks 23 at which the location of the measurement point P is shifted from the first upper surface 43 to the second upper surface 44. If the upper surface 41 including the first and second upper surfaces 43, 44 is generally flat, the measurement point P that follows the measurement point P1 would be the imaginary measurement point P2', as shown in FIG. 5. In the case of the first stack 40 in the shortage condition, however, the measurement point P that follows the measurement point P1 is the measurement point P2 which is located rearward of the imaginary measurement point P2'. The measurement point P2 is located on the second upper surface 44.

The displacement of the measurement point P in the longitudinal direction from the measurement point P1 to the measurement point P2 on the second upper surface 44 is greater as compared with the displacement in the same direction from the measurement point P1 to the imaginary measurement point P2'. Accordingly, the difference in the longitudinal distance Y that is detected in the first stack 40 in the shortage condition is greater as compared with the difference in the longitudinal distance Y detected in the first stack 40 having a generally flat upper surface 41, and the difference in the longitudinal distance Y (or the displacement of the measurement point P) exceeds the upper limit of the threshold range. Thus, the determination as to whether or not the upper surface 41 or the first stack 40 is in the shortage condition is accomplished by calculating the difference in the longitudinal distance Y for each of the specified lifted heights and then comparing the difference with the threshold range. In the present embodiment, the controller 28 corresponds to the determiner of the present invention.

When the first stack 40 is determined as being in the shortage condition, the controller 28 determines not to place or tier the second stack 50 on the first stack 40. Instead, the controller 28 controls the forklift truck 10 so that the forklift truck 10 moves to another loading/unloading area to place the second stack 50.

Figure 6:
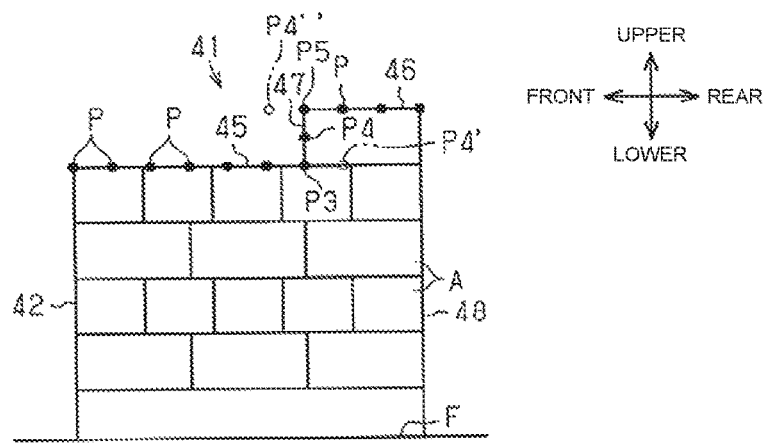
FIG. 6 is a schematic side view of the first load in a projecting condition.

The following will describe another condition of the first stack 40 in which the number of tiers of the loads A is greater in the rear part thereof than the front part, and hence there is a level difference in the upper surface 41 and the rear part of the upper surface 41 is located higher than the front part, as shown in FIG. 6. For the ease of explanation, this condition of the first stack 40 will be referred to as the projecting condition, since the first stack 40 is projecting in the rear part. The upper surface 41 of the first stack 40 in the projecting condition has a third upper surface 45 in the part having a smaller number of tiers of the loads A and a fourth upper surface 46 in the part having a greater number of tiers of the loads A than the part of the third upper surface 45. The third upper surface 45 is located lower than the fourth upper surface 46.

In the case of the first stack 40 in the projecting condition, as long as the measurement point P is located on the front surface 42, the longitudinal distance Y measured at the same emitting angle is a fixed value and does not vary irrespective of the shifting of the lifted height.

The first stack 40 of the projecting condition has a stepped front surface 47 that is formed by one or more loads A constituting the projection of the first stack 40. The front surface 47 extends vertically between the third upper surface 45 and the fourth upper surface 46.

In the case of the first stack 40 in the projecting condition, there exists a certain lifted height of the forks 23 at which the laser light is incident on the front surface 47. If the upper surface 41 is generally flat, the measurement point P that follows the measurement point P3 would be the measurement point P4', as shown in FIG. 6. However, in the case of the projecting condition, the laser light is incident on the front surface 47 of the first stack 40 before arriving at the measurement point P4'. As indicated above, the measurement point P that follows the measurement point P3 would be the measurement point P4 located on the front surface 47. The longitudinal distance between the measurement points P3 and P4 is smaller than the longitudinal distance between the measurement points P3 and P4'. Accordingly, in the case of the projecting condition, the difference in the longitudinal distance Y is less than the lower limit of the threshold range.

In the present embodiment, the forklift truck 10 is configured so that the laser light is incident on the front surface 42 when the forks 23 are at the lowest lifted height. Therefore, the difference in the longitudinal distance Y obtained while the measurement point P is moving on the front surface 42 of the first stack 40 is always less than the lower limit of the threshold range. Further, the controller 28 determines the first stack 40 as being in the projecting condition upon detecting that the difference in the longitudinal distance Y is less than the lower limit of the threshold range. This configuration permits the controller 28 to make correct determination of the projecting condition of the first stack 40 while the measurement point P is moving on the front surface 42 of the first stack 40 and prevents the controller 28 from erroneously determining that the first stack 40 is in the shortage condition.

As is the case of the first stack 40 having the shortage condition, when the first stack 40 is determined as being in the projecting condition, the controller 28 determines not to place or tier the second stack 50 on the first stack 40. Instead, for example, the controller 28 controls the forklift truck 10 to move to another loading/unloading area to place the second stack 50.

In placing the second stack 50 on the first stack 40, if the second stack 50 which is placed on the first stack 40 is shifted horizontally relative to the first stack 40 in such a manner that any part of the second stack 50 is positioned outside the peripheral edge of the first stack 40 in the horizontal direction, the stability of the whole stack of the loads A is lowered. In the loading operation of placing the second stack 50 of loads A on the pallet 51 on the first stack 40 in the loading/unloading area F, the second stack 50 needs to be placed at a predetermined position and at a predetermined angle. If the first stack 40 is placed deviating from the predetermined position and angle, which may result in the placement of the second stack 50 shifted relative to the first stack 40 as described above.

The controller 28 detects such deviation of the position and the angle of the first stack 40 by detecting four corners of the upper surface 41 of the first stack 40. Taking into consideration of the detected deviation in the position and the angle of the first stack 40, the controller 28 aligns the four corners of the second stack 50 with the four corners of the upper surface 41 of the first stack 40 detected in order to place the second stack 50 on the first stack 40. The following will describe the details of the detection of the positions of the four corners of the upper surface 41 of the second stack 50.

Figure 7:
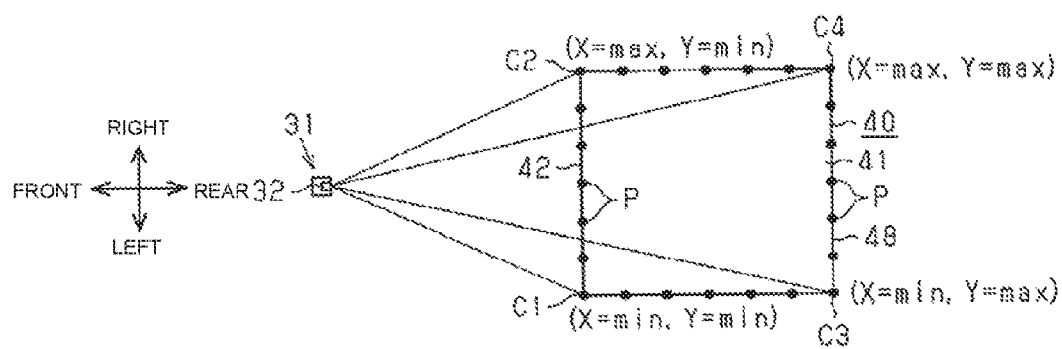
FIG. 7 is an illustration showing a relationship between four corners and the lateral and longitudinal directions of the first load.

As shown in FIG. 7, the lateral distance and the longitudinal distance measured with respect to the measurement point P on the upper surface 41 are denoted by X and Y, respectively. When the measurement point P is at the front left corner or at C1, both the lateral distance X and the longitudinal distance Y are minimum, and when the measurement point P is at the front right corner or at C2, the lateral distance X is maximum while the longitudinal distance Y is minimum.

When the measurement point P is at the rear left corner or at C3, the lateral distance X is minimum while the longitudinal distance Y is maximum, while when the measurement point P is at the rear right corner or at C4, both the lateral distance X and the longitudinal distance Y are maximum.

In terms of the lateral distance X, the left front corner C1 and the right front corner C2, which are laterally opposite to each other, have the same absolute value, and the left rear corner C3 and the right rear corner C4, which are laterally opposite to each other, have the same absolute value. The values obtained by Equations (2) and (3) are relative values with reference to the laser light at zero degrees measured when the laser light is incident on the first stack 40 at a right angle as viewed in a plan view. Therefore, the lateral distances X at any two measurement points P located at the lateral opposite corners are expressed by positive and negative values of the same number.

Each time the lifted height of the forks 23 is shifted by an increment, the controller 28 updates the data of the measurement point P which is expressed by P ($X_{min}$, $Y_{min}$) or P ($X_{max}$, $Y_{min}$). In each increment of the lifted height, the controller 28 also updates the data of the measurement point P which is expressed by P ($X_{min}$, $Y_{max}$) or P ($X_{max}$, $Y_{max}$).

As described above, the four measurement points P located at C1, C2, C3, and C4 correspond to the four corners of the upper surface 41 of the first stack 40. The controller 28 calculates the positional and angular deviations of the first stack 40 based on the relationship between the measurement points P at the four corners, the longitudinal distance Y and the lateral distance X of each measurement point P with respect to the emitting source 32 of the laser light, and the emitting angle of the laser light. The location of the first stack 40 is determined by the controller 28 based on the calculated deviations in the angle and the position and the controller 28 controls the forklift truck 10 so as to place or tier the second stack 50 on the first stack 40.

According to the present embodiment, the following effects are obtained.

(1) The forklift truck 10 includes the 2D rangefinder 31 and the controller 28. The controller 28 determines whether or not the second stack 50 is placeable on the first stack 40 based on distances measured by the 2D rangefinder 31. If the laser light is not emitted in the downwardly inclined direction but emitted horizontally on the first stack 40 having the upper surface 41 which is generally flat, the laser light is not incident on the first stack 40 any more after the measurement point P is moved or raised further from the upper edge of the front surface 42. The distance measured by the 2D rangefinder 31 becomes significantly greater or otherwise the distance becomes unmeasureble. When the first stack 40 is in a projecting condition as shown in FIG. 6, the measurement point P is located on the front surface 47 of the projecting load A at a certain lifted height of the forks 23. In this case, the distance between the emitting source 32 and the measurement point P (or the front surface 47 of the load A) is greater as compared with the distance between the emitting source 32 and the front surface 42 and shorter than the distance measured when the measurement point P is moved further from the upper edge of the front surface 42 to a measurement point P on the upper surface 41 which is generally flat. With this configuration, the controller 28 determines a projecting condition of the first stack 40 based on the distance between the emitting source 32 and the measurement point P.

However, in the case of the first stack 40 in the shortage condition as shown in FIG. 5, when the laser light is emitted in the horizontal direction and the measurement point P is moved further from the upper edge of the front surface 42, the distance measured by the 2D rangefinder 31 becomes significantly greater or otherwise the distance becomes unmeasureble as is the case of the first stack 40 having the upper surface 41 which is generally flat. Therefore, the shortage condition of the first stack 40 cannot be detected with the laser light emitted horizontally toward the first stack 40.

Meanwhile, in the present embodiment, the laser light is emitted in a downwardly inclined from above the upper surface 41 of the first stack 40. With this configuration, the laser light is emitted so as to be incident on the upper surface 41 of the first stack 40. Further, the shortage condition of the first stack 40 is detected by a change in the longitudinal distance Y due to the level difference in the upper surface 41.

(2) According to the present embodiment, the 2D rangefinder 31 which is fixed to the lift bracket 24 is movable with the forks 23 in accordance with the operation of the lift cylinders 20. Therefore, the lift cylinders 20 for lifting and lowering the forks 23 function as the mover device of the present invention. In placing the pallet 51 carrying the second stack 50 on the first stack 40, the forks 23 holding the pallet 51 are lifted. Whether or not the second stack 50 is placeable on the first stack 40 is determined by emitting the laser light to the first stack 40 in the course of the lifting operation of the forks 23. With this configuration, no other additional step is required to the determination.

(3) The projecting condition of the first stack 40 is determined when the difference in the longitudinal distance Y is less than the lower limit of the threshold range. Therefore, the projecting condition as well as the shortage condition are detectable.

(4) The 2D rangefinder 31 is provided at a position higher than the level of the bottom surfaces of the forks 23 so that no part of the 2D rangefinder 31 is positioned below the lower surfaces of the forks 23. Therefore, when the forks 23 are lowered, the 2D rangefinder 31 does not contact with the ground, which prevents damage to the 2D rangefinder 31.

(5) The controller 28 detects any positional and angular deviation of the first stack 40 using the longitudinal distance Y and the lateral distance X. With the detection of the positional and angular deviation, the controller 28 locates the position of the first stack 40, so that positional deviation of the second stack 50 with respect to the first stack 40 may be reduced.

(6) The positional and angular deviation is determined by detecting or figuring out the four corners of the stack of loads, which permits easy determination of the deviation requiring only locating of the four measurement points P at the four corners of the stack of loads.

It is to be noted that the present embodiment of the invention may be modified in the following manner.

The shortage condition of the first stack 40 may be detected by moving the measurement point P forward. In this case, moving of the measurement point P is started from a position rearward of the rear surface 48 of the first stack 40 opposite to the front surface 42, or, from a position on the upper surface 41 adjacent to the rear surface 48. In the case of the first stack 40 in the shortage condition, there exists a certain lifted height of the forks 23 at which the position of the measurement point P is shifted from the second upper surface 44 to the first upper surface 43.

When the upper surface 41 of the first stack 40 is generally flat, the measurement point P that follows the measurement point P2 is the measurement point P1', as shown in FIG. 5. When the first stack 40 is in the shortage condition, the laser light is blocked by the first upper surface 43, so that the measurement point P that follows the measurement point P2 is the measurement point P1 located on the first upper surface 43. Since first upper surface 43 is located higher than the second upper surface 44, the displacement of the measurement point P in the longitudinal direction from the measurement point P2 to the measurement point P1 is greater than the displacement of the measurement point P in the same direction from the measurement point P2 to the measurement point P1'. Therefore, the detected longitudinal distance Y is greater as compared with the case of the first stack 40 having a generally flat upper surface 41, so that the difference in the longitudinal distance Y (or the displacement of the measurement point P in the longitudinal direction) exceeds the upper limit of the threshold range as is the case of the present embodiment. When the displacement of the measurement point P exceeds the upper limit of the threshold range, the controller 28 determines that the first stack 40 is in the shortage condition.

The projecting condition of the first stack 40 may be detected by moving the measurement point P forward. In this case, moving of the measurement point P is started from a position rearward of the rear surface 48 of the first stack 40 opposite to the front surface 42 or from a position on the upper surface 41 adjacent to the rear surface 48. In the case of the first stack 40 in the projecting condition, there exists a certain lifted height of the forks 23 at which the laser light or the location of the measurement point P is shifted from the fourth upper surface 46 to the front surface 47 of the projecting load A.

If the upper surface 41 of the first stack 40 is generally flat, the measurement point P that follows the measurement point P5 would be the imaginary measurement point P4", as shown in FIG. 6. Since the first stack 40 in the projecting condition does not have any load A at the position corresponding to the imaginary measurement point P4", the laser light passes through the imaginary measurement point P4" and is incident on the front surface 47 of the projecting load A. The measurement point P4 on the front surface 47 is the measurement point that is subsequent to the measurement point P5. The longitudinal distance between the measurement points P5 and P4 is smaller as compared with the longitudinal distance between the measurement points P5 and P4". Therefore, in the case of the first stack 40 having the projecting condition, the difference in the longitudinal distance Y is less than the lower limit of the threshold range. When the displacement of the measurement point P is less than the lower limit of the threshold range, the controller 28 determines that the first stack 40 is in the projecting condition.

The mounting position of the 2D rangefinder 31 may be changed appropriately. For example, the 2D rangefinder 31 may be located on the upper part of the lift bracket 24 or the upper part of the load-handling device 12. The location of the 2D rangefinder 31 may optionally be located at a position that allows the 2D rangefinder 31 to emit the laser light or the measurement wave forward of the forklift truck 10 holding the pallet 51 carrying the second stack 50 by means of the forks 23.

The mover device that moves the 2D rangefinder 31 by its motion may be provided by the drive wheels of the forklift truck 10. In this case, the 2D rangefinder 31 is mounted at a high position, for example at a position in the upper part of the outer masts 18, that enables the 2D rangefinder 31 to emit laser light in a downwardly inclined direction from above and toward the upper surface 41 of the first stack 40. Further, the 2D rangefinder 31 is moved not vertically but horizontally in the longitudinal direction in determining whether or not the second stack 50 is placeable on the first stack 40. According to the configuration, the measurement point P moves rearward as the forklift truck 10 approaches the first stack 40. With the measurement point P moving rearward, both the shortage condition and the projecting condition of the first stack 40 are detectable. Alternatively, the rearward movement of the measurement point P may be accomplished by moving the 2D rangefinder 31 by means of the reach cylinders 22. Still alternatively, the mover device may be provided by any other device of the forklift truck 10 that is capable of moving the 2D rangefinder 31 in the vertical direction by its motion.

The increments of the lifted height need not necessarily be constant, and the magnitude of the increments may be varied for each of the specified lifted heights. In this case, the threshold range is specified for each specified lifted height, accordingly. The lifted heights need not necessarily be predetermined, and the lifted heights may be variable. The displacement of the measurement point P is proportional to the displacement of the 2D rangefinder 31. Therefore, the controller 28 can calculate the individual threshold ranges by adding and subtracting a margin to and from the displacement of the measurement point P calculated by the distance moved of the 2D rangefinder 31.

The lowest lifted height of the forks 23 may be a height at which the measurement point P is located on the upper surface 41. In this case, the projecting condition of the first stack 40 is determined upon determining that the difference in the longitudinal distance Y is less than the lower limit of the threshold range.

In the present embodiment, each of the first and second stacks 40, 50 is composed of multiple loads A. According to the present invention, however, the first and second stacks 40, 50 may be formed of a single load A of a rectangular form. In this case, similar shortage condition and projecting condition due to the presence of a foreign object placed on the load A can be detected. Furthermore, the shape of the first and second stacks 40, 50 is not limited to a rectangular shape, and it may optionally be selected from other polygons.

The 2D rangefinder 31 may be replaced with an ultrasonic sensor that emits ultrasonic wave from its emitting source and measures the distance between the emitting source and the measurement point P at which ultrasonic wave is incident and reflected.

The forklift truck 10 is not limited to an unmanned, automated guided vehicle, and it may be a manned forklift truck operated by an operator. In this case, the manned forklift truck may have a switch for executing the determination of whether or not the second stack is placeable on the first stack.

The projecting condition of the first stack 40 may be detected in a manner different from that described with reference to the present embodiment. Alternatively, the projecting condition need not necessarily be detected.

The method of detecting the positional and angular deviation of the first stack 40 is not limited to the locating of the measurement points P at the four corners. The shape of the upper surface 41 of the first stack 40 may be determined by plotting all measurement points P for each of the specified lifted heights.

The storage 29 need not necessarily store data of the height information of the first stack 40. In this case, each determination process of the placeability of the second stack is started from the same lowest lifted height.

The 2D rangefinder 31 may be of the configuration that does not vary the emitting angle of the laser light in the horizontal direction. In this case, the emitting angle in the horizontal direction is fixed. However, the shortage condition and the projecting condition of the first stack 40 can be detected by the incidence of the laser light on the part thereof causing the level difference.

What is claimed is:

1. A forklift truck that is configured for placing on a first load a second load, comprising:
    a pair of forks for holding the second load;
    an actuator for raising and lowering the forks;
    a two-dimensional rangefinder having an emitting source configured to emit a measurement wave in a downwardly inclined direction from above and toward the first load, the two-dimensional rangefinder being configured to measure a distance between the emitting source and a measurement point which is located on a surface of the first load and at which the measurement wave is incident;
    a mover device that is configured to move the two-dimensional rangefinder so that the measurement point moves in a longitudinal direction in which the first load and the forklift truck carrying the second load face each other;
    a calculator configured to calculate a longitudinal distance between the emitting source and the measurement point based on the distance measured by the two-dimensional rangefinder; and
    a determiner configured to determine that the first load is in a condition in which there is a level difference between a front part and a rear part of an upper surface of the first load, and the front part is higher than the rear part, when a variation in the longitudinal distance that is generated in response to a displacement of the two-dimensional rangefinder moved by the mover device exceeds an upper limit of a specified threshold range;

wherein the upper limit of the specified threshold range is a value obtained by adding a margin to a displacement of the measurement point.

2. The forklift truck according to claim 1, wherein the mover device is the actuator.

3. The forklift truck according to claim 1, wherein the determiner is configured to determine that the rear part of the upper surface of the first load is higher than the front part when the variation in the longitudinal distance in response to the displacement of the two-dimensional rangefinder moved by the mover device is less than a lower limit of the specified threshold range.

4. The forklift truck according to claim 2, wherein the two-dimensional rangefinder is located higher than a level of bottom surfaces of the forks.

5. A method of operating a forklift truck in connection with placing a second load onto a first load, the method comprising the steps of:

holding the second load by means of a pair of forks of the forklift truck;

operating an emitting source of a two-dimensional rangefinder of the forklift truck to emit a measurement wave in a downwardly inclined direction from above and toward the first load, and measuring a distance between the emitting source and a measurement point which is located on a surface of the first load and at which the measurement wave is incident;

moving the two-dimensional rangefinder so that the measurement point moves in a longitudinal direction in which the first load and the forklift truck carrying the second load face each other;

calculating a longitudinal distance between the emitting source and the measurement point based on the distance measured by the two-dimensional rangefinder; and determining that the first load is in a condition in which there is a level difference between a front part and a rear part of an upper surface of the first load, and the front part is higher than the rear part, when a variation in the longitudinal distance that is generated in response to the displacement of the two-dimensional rangefinder exceeds an upper limit of a specified threshold range;

wherein the upper limit of the specified threshold range is a value obtained by adding a margin to a displacement of the measurement point.

6. The method of claim 5, wherein the two-dimensional rangefinder is moved by raising and lowering the forks.

7. The method of claim 5, wherein it is determined that the rear part of the upper surface of the first load is higher than the front part when the variation in the longitudinal distance in response to the displacement of the two-dimensional rangefinder is less than a lower limit of the specified threshold range.

* * * * *